July 5, 1949. T. IAVELLI 2,475,242
INTERNAL GEAR PUMP FOR TRANSMISSION MAINSHAFTS
Filed April 4, 1947 2 Sheets-Sheet 1

INVENTOR.
Teno Iavelli.
BY
Harness & Harris
ATTORNEYS.

July 5, 1949.  T. IAVELLI  2,475,242
INTERNAL GEAR PUMP FOR TRANSMISSION MAINSHAFTS
Filed April 4, 1947  2 Sheets-Sheet 2
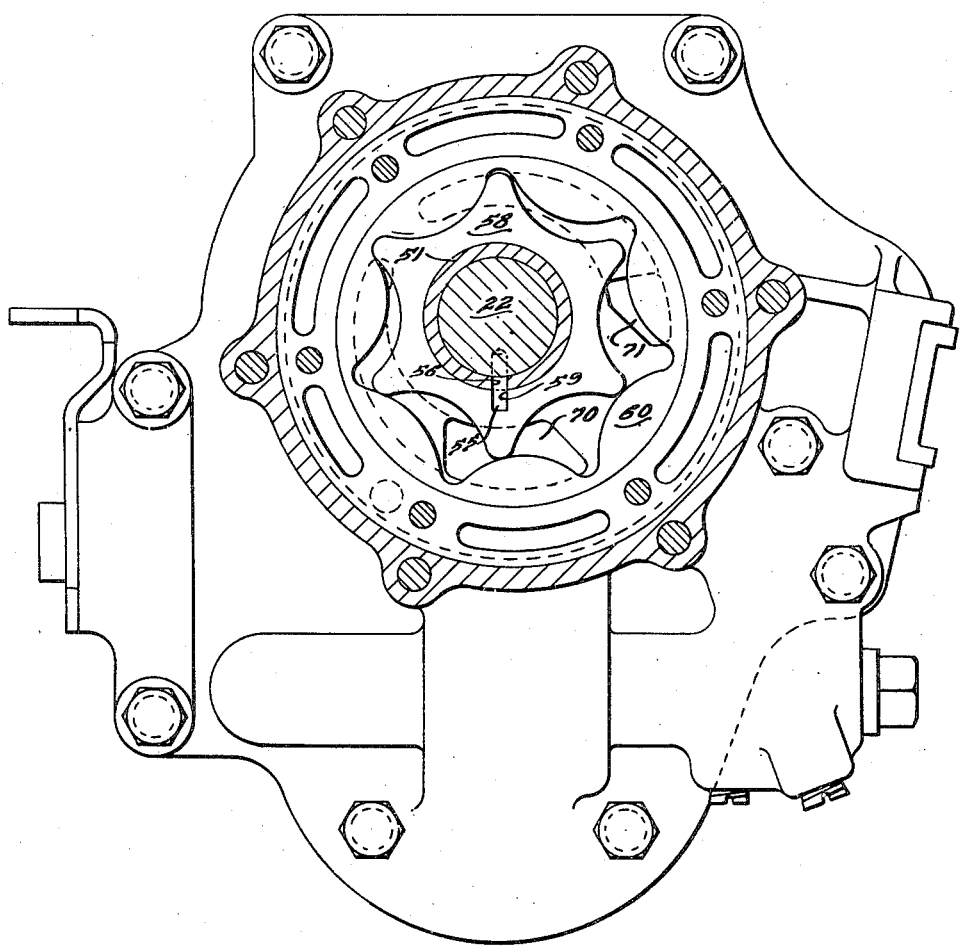
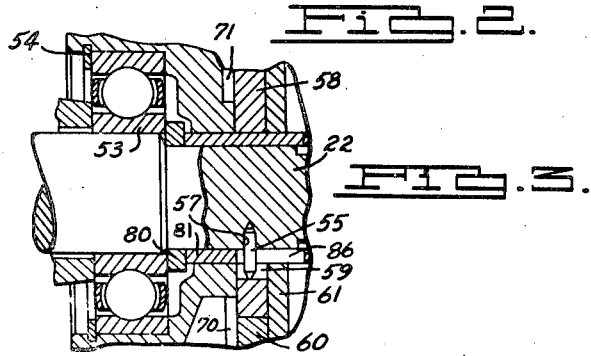
INVENTOR.
Teno Iavelli.
BY
Harness & Harris
ATTORNEYS.

Patented July 5, 1949

2,475,242

UNITED STATES PATENT OFFICE 2,475,242

INTERNAL GEAR PUMP FOR TRANSMISSION MAIN SHAFT

Teno Iavelli, Detroit, Mich., assignor to Chrysler Corporation, Highland Park, Mich., a corporation of Delaware Application April 4, 1947, Serial No. 739,485

14 Claims. (Cl. 103—126)

This invention relates to an internal gear pump adapted for installation on the mainshaft of a transmission.

In transmissions of the automatic or semi-automatic types it is quite common to have the speed ratio changes accomplished by means of hydraulically operated control cylinders or servo-motor means. Such control cylinders or servo-motor means require a constant supply of pressure fluid which has usually been furnished by some form of oil gear pump located within the transmission casing. Prior to my invention it has been common practice to mount such oil gear pumps on the countershaft of the transmission and drive the pumps by means of a gear train driven by a gear on the transmission mainshaft. Such an arrangement was expensive due to the number of gears and other elements required and, furthermore, it often limited the size and type of pump used due to the pump being located on the countershaft in the lower portion of the transmission casing where the available space was somewhat restricted.

While this invention is shown applied to a specific type of transmission, it should be borne in mind that it is designed for application to any type of transmission for the problem solved by this invention is one that arises in all types of transmissions. This invention proposes the mounting of an internal gear pump directly on the mainshaft so that its gear train may be eliminated and a more economical construction provided. Not only will such a construction reduce the cost of manufacture, by the elimination of parts, but it also allows for greater selectivity of oil pumps due to the position of the pump having been removed from a location where its size was relatively restricted and relocated at a position where its size can be considerably increased, if desired. This permits pumps of various dimensions and capacities to be easily installed and at the same time a simple, positive, quiet driving means for the pump has been provided. The mounting of the oil pump on the mainshaft raises problems of assembly and maintenance and it is the method of mounting the internal gear pump on the mainshaft, as well as the particular assemblage of elements, that constitutes my invention.

One reason why gear pumps have not been installed on transmission mainshafts has been that this location of the pump often interfered with the installation and maintenance of the mainshaft thrust bearing mounted between the transmission gear train and the gear pump at the rear end of the transmission casing. It is obvious that it is desirable to have a construction that permits adjustment of this thrust bearing without dismantling of the transmission housing.

In addition to providing a gear pump assembly for a transmission mainshaft that is economical to manufacture I have also evolved a method of assembly that is new, simple and labor saving.

One object of this invention is to provide an internal gear pump for installation on a transmission mainshaft which pump contains a minimum of parts and is economical to manufacture and install.

Another object of this invention is to provide a gear pump for installation on the transmission mainshaft which will permit adjustment of the thrust bearing without dismantling of the transmission casing.

Another object of this invention is to provide an internal gear pump for a transmission mainshaft that readily permits the transmission of forces from the rear end of the transmission casing through the gear pump assembly to the thrust bearing located forward of the gear pump.

Another object of this invention is to provide an internal gear pump for a transmission mainshaft which is adapted for quick installation at a minimum cost.

Another object of this invention is to provide a gear pump for installation on a transmission mainshaft which permits change in the size and shape of the pump rotors at a minimum expense and with the least amount of trouble.

In the drawings:

Fig. 2 is a sectional elevational view along the line 2—2 of Fig. 1; and

Fig. 3 is an enlarged fragmentary sectional view of a portion of a transmission mainshaft including a modified form of internal gear pump mounting means.

Figure 1:
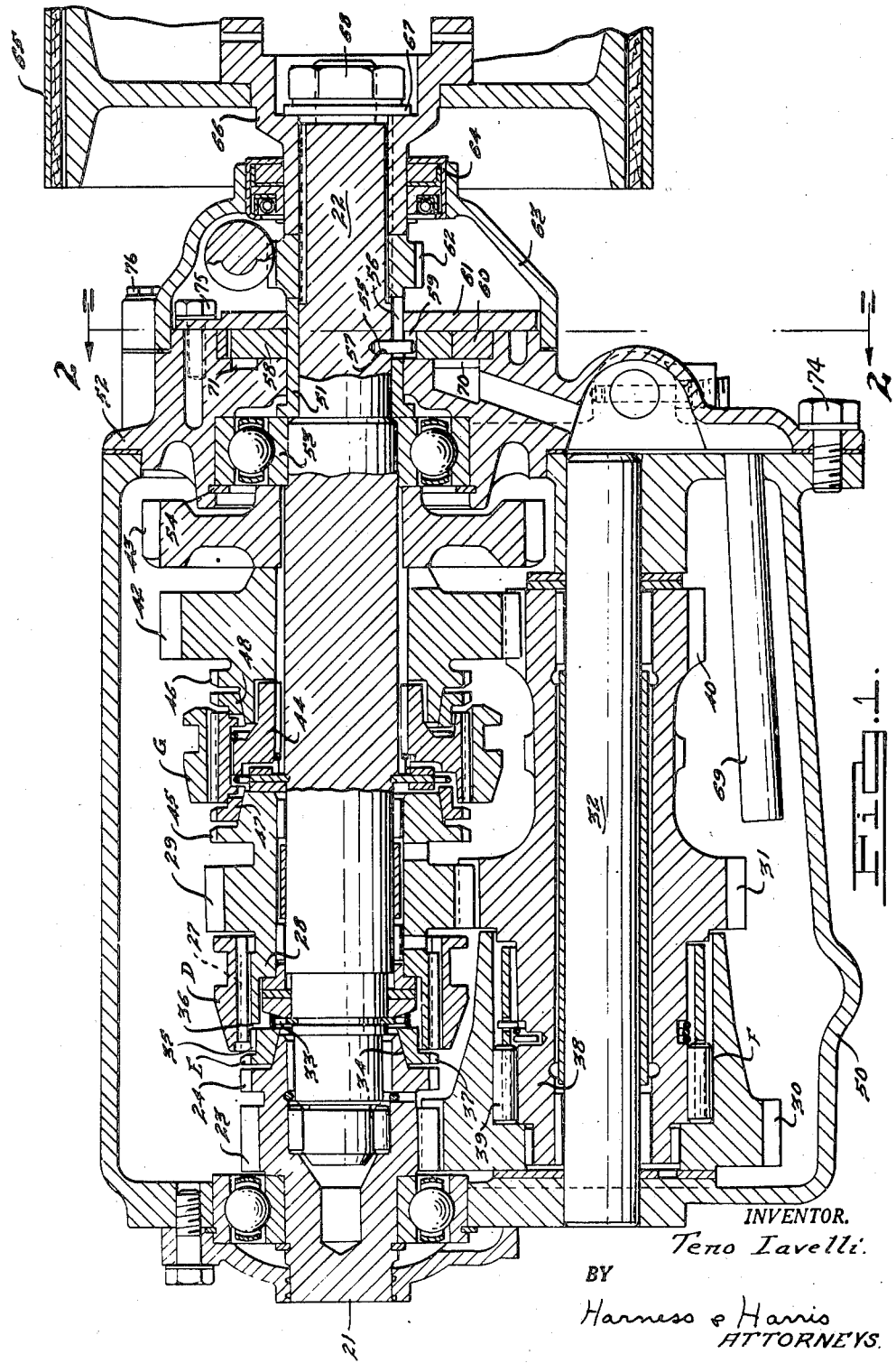
Fig. 1 is a sectional elevation view of a typical transmission to which my invention has been applied for illustrative purposes.

In the drawings, Fig. 1 illustrates a typical motor vehicle transmission having a conventional gear pump 58, 60 mounted on the rear end of the mainshaft forward of the transmission brake drum 65.

The transmission comprises an input or driving shaft 21 which receives drive from an engine by way of a clutch assembly and an output or mainshaft 22 which is adapted to transmit drive to the vehicle ground wheels. The driving shaft 21 carries the main driving gear or pinion 23 which has teeth 24 adapted to be engaged by the teeth of clutch sleeve D.

Sleeve D is slidably splined on the axially fixed teeth 27 of a hub 28 carried by the driven third speed gear 29 which is rotatably journalled on the mainshaft 22 and adapted to be clutched thereto. The forward shift of sleeve D for clutching with teeth 24 is controlled by a blocker E whereby such clutching is limited to synchronous relationship in the speeds of rotation of gears 23 and 29 and, in the particular transmission illustrated, limited to engine coast conditions. When sleeve D is clutched with teeth 24, then the gears 23 and 29 are in two-way direct drive relationship for a 1 to 1 speed ratio drive therebetween.

Gear 29 is also adapted to be driven from gear 23 at a speed ratio different from 1 to 1 and to this end we have shown a countershaft type one-way reduction driving means between these gears. This drive comprises the coaxially rotatable countershaft gears 30 and 31 respectively in constant mesh with gears 23 and 29 and having an overrunning clutch F operably interposed therebetween. A stationarily mounted countershaft 32 provides a journal support for the countershaft gears. Assuming the usual clockwise rotation of shaft 21, as viewed when looking from front to rear of Fig. 1, then overrunning clutch F will automatically clutch gears 30 and 31 together when gear 30 is driven counterclockwise at a speed tending to exceed that of gear 31 and automatically release the drive between these gears to allow gear 30 to freely slow down below the speed of gear 31.

As thus far described, it will be apparent that with the parts arranged as in Fig. 1 drive of shaft 21 will cause the output gear 29 to be driven at a reduction drive through gears 23, 30, overrunning clutch F, and gear 31. Should the sleeve D be biased forwardly during this reduction drive, blocker E will obstruct sleeve D in an intermediate position of its shift preventing ratcheting of its teeth with teeth 24. However, if the driver releases the engine throttle control in the form of the usual accelerator pedal then overrunning clutch F will allow gear 23 to freely coast down relative to the sustained speed of gear 29 and when the speed of gear 23 reaches that of gear 29 blocker E will move to an unblocking position and allow sleeve D to move further forwardly to clutch with teeth 24 under synchronous conditions to provide the direct drive, clutch F continuing its overrunning operation. Upon return of sleeve D to its disengaged Fig. 1 position, followed by speeding up the engine, overrunning clutch F will automatically engage to restore the reduction drive.

Blocker E is under constant bias by a spring 33 of very light compression to cause the blocker to frictionally engage the cone portion 34 of gear 23 whereby the blocker attempts to assume the speed of gear 23 within the limits allowed by a lost motion "clocking" connection with hub 28 provided by the engagement of blocker drive lug 35 in a recess 36 of hub 28. The blocker has blocking teeth 37 engageable with the teeth of sleeve D to perform the blocking function.

Countershaft gear 31 is a part of a cluster comprising the cam portion 38 for the rollers 39 of overrunning clutch F and a gear 40. Meshed with gear 40 is a mainshaft first speed gear 42 loose on the shaft 22, the latter carrying splined thereto the reverse driven gear 43. A reverse idler gear (not shown) is rotatably journalled on an idler shaft and is in constant mesh with gear 40. For the reverse drive the idler gear is shifted to mesh with gear 43.

A manually shiftable clutch G is slidably splined on a hub 44 fixed to shaft 22 and selectively clutches by shifting clutch G forwardly or rearwardly with teeth 45 or 46 under control of conventional synchronizer blockers 47 and 48 thereby to selectively clutch shaft 22 either with gear 29 or gear 42.

When clutch G is shifted forwardly to clutch with teeth 45 of gear 29, then with sleeve D released as in Fig. 1, there is provided a normal vehicle starting ratio in third speed through parts 23, 30, F, 31, 29, 45, G, 44, and 22. If now sleeve D is clutched with teeth 24 as aforesaid, then fourth speed or direct drive is obtained through parts 23, 24, D, 28, 29, 45, G, 44, and 22.

When clutch G is shifted rearwardly to clutch with teeth 46 of gear 42, then with sleeve D released as in Fig. 1, there is provided a maximum torque multiplying drive in first or low through parts 23, 30, F, 40, 42, 46, G, 44, and 22. If now sleeve D is clutched with teeth 24 as aforesaid, then second speed is obtained through parts 23, 24, D, 28, 29, 31, 40, 42, 46, G, 44, and 22.

For low reverse the idler gear (not shown) is meshed with gear 43, thus effecting reverse drive through parts 23, 30, F, 40, 43, the idler gear and 22. On coast, step-up of the reverse may be obtained by clutching of sleeve D, the faster reverse drive then passing through parts 23, 24, D, 29, 31, 40, 43 the idler gear and 22. Likewise by release of sleeve D the original low reverse drive may be restored.

For a more complete understanding of this particular type of transmission reference should be made to the co-pending application of A. J. Syrovy et al., Serial Number 596,842, filed May 31, 1945.

After mounting countershaft 32, with its assembled gears and the over-running clutch mechanism F, in the lower part of the transmission housing 50, the mainshaft 22, with the gears and clutch mechanisms extending between pinion 23 and gear 43, is then mounted in the upper part of the housing 50. The next step is to mount rotor sleeve 51 in the interior or inboard face of the transmission pump housing 52 after which the shaft bearing 53 and snap ring 54 are pressed into position in the interior or inboard face of the pump housing. Pump housing 52, with the aforementioned assembled parts, is then slipped on the rear end portion of mainshaft 22 and bolted to exterior side of the transmission housing 50 by the bolts 74. Now the oil pump rotor drive pin 55 is inserted from the exterior side of the housing through a perforation, preferably a hole or slot 56 in rotor sleeve 51 into a hole or seat 57 in mainshaft 22. The rotor drive pin 55 is of such a length, with respect to the depth of the hole 57 in the mainshaft 22, that a portion of pin 55 protrudes outwardly beyond the rotor sleeve 51. Inner pump rotor 58, having slot 59, suitable to receive the protruding end of the rotor pin 55, is next mounted on the exteriorly protruding rear end portion of mainshaft 22. The pump rotor 58 is seated in the exterior or outboard face of housing 52 after which the outer pump rotor 60 is placed around inner rotor 58 and then pump cover plate 61 is placed on the rear end portion of mainshaft 22 and then bolted to pump housing 52 by the bolts 75. Next speedometer drive gear 62, which is splined to mainshaft 22, is placed in position and then the pump housing cover 63, carrying the shaft cover seal 64, is bolted to the pump housing 52 by bolts 76. The final step in the assembly of the transmission consists of placing the transmission brake drum 65 on the collar of the mainshaft sleeve 66, mounting the sleeve 66 on the end of mainshaft 22, placing washers 67 on the mainshaft and then threading the nut 68 on the rear end of mainshaft and drawing it up tight against the washers 67 so that a force is transmitted through the sleeve 66, the gear 62, and the sleeve 51 to the bearing 53 which acts as a thrust bearing for the mainshaft gear train. It is apparent that by my particular arrangement of parts and method of assembly it is possible to mount an internal gear pump on the mainshaft of a transmission for positive drive through the rotor pin means 55, and still provide a means for tightening the bearing 53 from the rear end of the mainshaft by the nut 68. It is obvious that the gear pump inner rotor 58 can not be fixed to the mainshaft 22 for it would prevent a force being transmitted from the nut 68 through the sleeve 66 and gear 62 to the bearing 53. My particular arrangement of machine elements provides a simple, inexpensive means of mounting a gear pump on the mainshaft without interfering with the adjustment of the mainshaft thrust bearing inboard of the gear pump. It is obvious that the elements 62—68 may be eliminated and nut means 68 applied directly to sleeve 51 in applying my invention.

The inner rotor sleeve 51 may be made in two pieces as shown in Fig. 3. This modification consists of a thrust washer 80 to bear against the bearing 53 and a slotted, cylindrical, rotor sleeve 81 to extend between the speedometer drive gear 62 and the aforementioned thrust washer. With such a construction the thrust washer 80 is first mounted in the pump housing 52, then the bearing 53 and snap ring 54 are pressed into position. The pump housing 52 is then mounted on the transmission case 50 and the pump rotor 58 connected to the mainshaft 22 by means of the rotor drive pin 55. The rotor sleeve 81 may be mounted on the shaft 22 before or after the pin 55 is inserted in the hole 57 in the shaft 22. If the sleeve 81 is mounted on the shaft 22 before the pin 55 is inserted in the sleeve slot 56 and hole 57 of shaft 22, then the assembly is the same as previously set forth. If the pin 55 is inserted in the hole 57 of mainshaft 22, prior to the placing of the rotor sleeve on the shaft 22, then the rotor sleeve must be turned end for end so that the slot 86 extends from the thrust washer to the pin 55. With the open end of the slot towards the thrust washer and aligned with the pin 55 the rotor sleeve may be thrust on the shaft 22 and then pump rotors and other elements assembled as aforementioned.

With the oil pump assembled on the mainshaft 22 by any of the several methods set forth above, operation is as follows; rotation of mainshaft 22 drives the inner pump rotor 58, through the rotor drive pin 55, and this reduces the pressure at the suction side of the pump 70 so that oil is drawn up from the transmission case sump through the inlet pipe 69. Oil is discharged from the pump under pressure, through the discharge port 71, and directed to the hydraulically operated shift cylinder on other units requiring a supply of pressure fluid.

Thus it is clear that I have provided a simple, improved means of mounting an oil pump on the transmission mainshaft without interfering with the assembly or maintenance of the elements located between the oil pump and transmission gear train. The loose, positive mounting of the gear pump on the mainshaft, so as to permit force to be transmitted from the rear end of the transmission case through the pump to the mainshaft thrust bearing, is one of the predominant features of my construction.

While I have illustrated and described but two embodiments of my invention it is to be understood that such are for purposes of illustration only and it is contemplated that those skilled in the art may modify certain details without departing from the spirit and scope of the invention as defined in the claims appended hereto.

I claim:

1. A gear pump assembly for a transmission mainshaft comprising a pump housing, a flanged, slotted rotor sleeve extending transversely through said housing, a thrust bearing mounted in the interior face of said housing adjacent the flanged end of said rotor sleeve, an internal gear pump including driving and driven rotors positioned in the exterior face of said housing and mounted concentrically about the slotted end of the rotor sleeve, the inner driving rotor of said pump having a transverse slot therethrough adapted to be aligned with the slot in said rotor sleeve, a pin mounted in said inner rotor slot and extending through the slot in the rotor sleeve into a hole in the transmission mainshaft, a speedometer drive gear splined on said mainshaft and having portions bearing against the slotted end of said rotor sleeve, a mainshaft sleeve adapted to bear against said speedometer drive gear, and a nut threaded on said mainshaft to cause a force to be transmitted to the rotor sleeve and through the gear pump to the thrust bearing.

2. A gear pump assembly for a transmission mainshaft comprising a pump housing, a flanged, slotted rotor sleeve extending transversely through said housing, a thrust bearing mounted in the inner face of said housing adjacent the flanged end of said rotor sleeve, an internal gear pump comprising driving and driven rotors mounted in the outer face of said housing and mounted concentrically about the slotted end of the rotor sleeve, the inner driving rotor of said pump having a transverse slot therethrough adapted to be aligned with the slot in said rotor sleeve, a pin mounted in said inner rotor slot having a portion extending through the slot in the rotor sleeve into a seat in the transmission mainshaft, a speedometer drive gear mounted on said mainshaft and axially shiftable thereof having portions bearing against the slotted end of said rotor sleeve, a pump housing cover plate with a cover seal enclosing the outer face of said pump, a mainshaft sleeve extending through the cover plate seal and bearing against the speedometer drive gear, and a nut threaded on the mainshaft adapted to cause a force to be transmitted along the mainshaft through the gear pump to the thrust bearing.

3. A gear pump assembly for a transmission mainshaft comprising a pump housing, a flanged, longitudinally slotted rotor sleeve extending transversely through said housing with the flanged end of said sleeve adjacent the inboard face of said housing, a thrust bearing mounted in the inboard face of said housing adjacent the flanged end of said rotor sleeve, an internal gear pump including driving and driven rotors mounted in the outboard face of said housing and mounted concentrically about the slotted portion of the rotor sleeve, the inner driving rotor of said pump having a transverse slot therethrough adapted to be aligned with the slot in said rotor sleeve, a pin mounted in said inner rotor slot with portions extending through the slot in the rotor sleeve into a seat in the transmission mainshaft, a mainshaft sleeve adapted to bear against the outboard end of said rotor sleeve, and means to exert a force against said mainshaft sleeve which force can be transmitted from the mainshaft sleeve through the gear pump to the thrust bearing.

4. A gear pump assembly for a transmission mainshaft comprising a pump housing, a longitudinally, slotted rotor sleeve extending transversely through said housing, said sleeve having a radially extending flange adjacent its inner end, a thrust bearing mounted in the inner face of said housing inwardly of and adjacent the flanged end of said rotor sleeve, an internal gear pump comprising driving and driven rotors mounted in the outer face of said housing concentrically about the slotted portion of the rotor sleeve, the inner driving rotor of said pump having a transverse slot therethrough adapted to be aligned with the slot in said rotor sleeve, a pin mounted in said inner rotor slot having portions extending through the slot in the rotor sleeve into a seat in the transmission mainshaft, and means adapted to exert a force against the outer end of said rotor sleeve, which force may be transmitted through said pump assembly to said thrust bearing.

5. A gear pump assembly adapted to be mounted on a transmission mainshaft exteriorly of the transmission casing comprising a pump housing, a slotted rotor sleeve extending through said housing, a thrust bearing mounted in the interior face of the pump housing, an internal gear pump comprising driving and driven rotors mounted on the external face of said pump housing, the driving rotor of said pump being connected to the transmission mainshaft by means of a pin extending from the inner pump driving rotor through the slot in said rotor sleeve into a hole in the transmission mainshaft, a mainshaft sleeve mounted so as to transmit an axially extending force to said rotor sleeve, and a nut adapted to be drawn up against said mainshaft sleeve to cause an axially extending force to be transmitted to the rotor sleeve and through the pump assembly to the thrust bearing.

6. A gear pump assembly for a transmission mainshaft adapted to be mounted on the transmission case outboard of a mainshaft thrust bearing comprising a pump housing with a transverse mainshaft passageway, a perforated rotor sleeve extending through said mainshaft passageway, a thrust bearing mounted in the inboard face of said pump housing adjacent one end of said rotor sleeve, a gear pump mounted concentrically about said rotor sleeve and located in the outboard face of the pump housing, said pump comprising a transversely slotted inner driving rotor, drive pin means mounted in the slot in the inner rotor and extending through a perforation in the rotor sleeve into a seat in the mainshaft, and thrust transmitting means mounted on the mainshaft adjacent the outboard side of the gear pump adapted to bear against the end of the rotor sleeve remote from the thrust bearing and transmit an axially directed force to said thrust bearing.

7. A gear pump assembly for a transmission mainshaft adapted to be mounted on the exterior of the transmission casing outboard of a mainshaft thrust bearing comprising a pump housing with a transverse mainshaft passageway, a perforated rotor sleeve extending through said mainshaft passageway, a thrust bearing mounted in the inboard face of said pump housing adjacent one end of said rotor sleeve, a pump mounted concentrically about said rotor sleeve and located in the outboard face of the pump housing, said pump comprising a transversely slotted inner driving rotor, drive pin means mounted in the slot in the inner rotor and extending through a perforation in the rotor sleeve into a seat in the mainshaft, a driven rotor mounted concentrically about the driving rotor and a pump cover plate retaining said pump elements in position in the outboard face of the pump housing, and thrust transmitting means mounted on the mainshaft outboard of said pump adapted to bear against the end of the rotor sleeve remote from said thrust bearing to cause a force to be exerted against said thrust bearing.

8. The method of assembling an internal gear pump on the mainshaft of a transmission exteriorly of the transmission casing consisting of inserting a rotor sleeve through a shaft opening in a pump housing, mounting a thrust bearing in the interior face of the housing against one end of the rotor sleeve, inserting the mainshaft through the thrust bearing and the rotor sleeve, connecting the rotor sleeve to the mainshaft, mounting an internal gear pump on the exterior face of the pump housing and connecting the pump to the mainshaft, mounting a pump cover plate on the pump housing, and applying a force transmitting means to the exteriorly exposed portion of the mainshaft to exert a force against the end of the rotor sleeve opposite the end bearing against the thrust bearing.

9. The method of assembling an internal gear pump on the mainshaft of a transmission exteriorly of the transmission casing consisting of mounting a thrust washer and a thrust bearing in the inboard face of a pump housing adjacent a mainshaft passage through the housing, inserting the mainshaft through the thrust bearing, thrust washer, and mainshaft passage in the housing, placing a rotor sleeve on the mainshaft within the housing, concentrically mounting the driving rotor of the gear pump about the rotor sleeve on the outboard face of the housing connecting the driving rotor to the mainshaft through the rotor sleeve, mounting the driven rotor and pump cover plate on the outboard face of the pump housing about the driving rotor, and applying a force transmitting means to the outboard end of the mainshaft to exert a force against one end of the rotor sleeve and force the other end of the rotor sleeve against the thrust washer.

10. The method of assembling an internal gear pump including the housing thereof on a transmission mainshaft adjacent the exterior side of a mainshaft thrust bearing and adjacent a mainshaft passage through the housing consisting of the steps of inserting a rotor sleeve through the pump housing mainshaft passage, mounting the mainshaft thrust bearing in the interior face of the pump housing, inserting the mainshaft through the rotor sleeve, mounting a gear pump on the exterior face of the pump housing drivingly connecting the pump to the mainshaft, and applying a force transmitting means to the exteriorly exposed portion of the mainshaft adapted to transmit an axially extending force through the rotor sleeve to the thrust bearing.

11. A gear pump assembly for a transmission mainshaft adapted to be mounted on the exterior of the transmission casing comprising a pump housing with a transversely extending mainshaft passageway, a longitudinally slotted rotor sleeve, having a flange end portion, extending through said housing passageway, a thrust bearing mounted in the interior face of said pump housing inwardly of and adjacent the flanged end of said rotor sleeve, an internal gear pump including driving and driven rotors located in the exterior face of said pump housing and mounted concentrically about the slotted portion of said rotor sleeve, the inner driving rotor of said pump having a transversely extending slot extending outwardly from its inner edge and adapted for alignment with the slot in said rotor sleeve, a pump rotor drive pin mounted in the slot in said inner pump rotor and extending through and beyond the slot in said rotor sleeve, the projecting end of said drive pin being adapted for insertion in a hole in the transmission mainshaft so as to connect the pump to the mainshaft, and a force transmitting means adapted to bear against the slotted portion of said rotor sleeve to provide a means for exerting an axially directed force against said thrust bearing.

12. A gear pump assembly for a transmission mainshaft adapted to be mounted on the exterior of the transmission casing comprising a pump housing with a mainshaft bore extending longitudinally therethrough, a perforated rotor sleeve mounted in said mainshaft bore, a thrust bearing mounted in the inboard face of said pump housing in contiguous relation with an end of said rotor sleeve, an internal gear pump including driving and driven rotors mounted concentrically about the perforated portion of said rotor sleeve in the outboard face of the pump housing, the inner driving rotor of said pump having a slot adapted to be aligned with a perforation in said rotor sleeve, a rotor drive pin mounted in said rotor slot and extending through and beyond said rotor sleeve perforation, the projecting end of said rotor drive pin being adapted for insertion in a slot in the mainshaft so as to connect said pump to said mainshaft for positive drive, and a force transmitting means for applying an axially directed force to the perforated end of said rotor sleeve.

13. A gear pump assembly for a transmission mainshaft adapted to be mounted on the exterior of the transmission casing comprising a pump housing with a mainshaft bore extending longitudinally therethrough, a perforated rotor sleeve mounted in said mainshaft bore, a thrust bearing mounted in the inner face of said pump housing in contiguous relation with the inner end of said rotor sleeve, an internal gear pump including driving and driven rotors mounted concentrically about the perforated portion of said rotor sleeve in the outer face of the pump housing the inner driving rotor of said pump having a slot adapted to be aligned with a perforation in said rotor sleeve, a rotor drive pin mounted in said rotor slot and extending through and beyond said rotor sleeve perforation, the projecting end of said rotor drive pin being adapted for insertion in a slot in the mainshaft so as to connect said pump to said mainshaft for positive drive, a mainshaft sleeve and a nut means adapted to be mounted on the exteriorly exposed portions of the mainshaft so as to exert an axially directed force against the outer end of said rotor sleeve that can be transmitted through said pump assembly to said thrust bearing.

14. A gear pump assembly for a transmission mainshaft comprising a pump housing with a mainshaft bore extending longitudinally therethrough, a perforated rotor sleeve mounted in said mainshaft bore, a thrust washer and a thrust bearing mounted in the inboard face of said pump housing in contiguous relation with the inboard end of said rotor sleeve, an internal gear pump comprising driving and driven rotors mounted concentrically about the perforated portion of said rotor sleeve and positioned in the outboard face of the pump housing the inner driving rotor of said pump having a slot adapted to be aligned with a perforation in said rotor sleeve, a rotor drive pin mounted in said rotor slot and extending through and beyond said rotor sleeve perforation, the projecting end of said rotor drive pin being adapted for insertion in a seat in the mainshaft so as to connect said pump to said mainshaft for positive drive, a pump housing cover mounted on the outboard face of said pump housing, a mainshaft sleeve adapted to bear against the outboard end of the rotor sleeve and nut means for the mainshaft adapted to force said mainshaft sleeve against said rotor sleeve and transmit an axially extending force to said thrust washer and thrust bearing.

TENO IAVELLI.

REFERENCES CITED

The following references are of record in the file of this patent:

UNITED STATES PATENTS

| Number | Name | Date |
|---|---|---|
| 2,106,870 | Floss | Feb. 1, 1938 |
| 2,229,337 | Neracher et al. | Jan. 21, 1941 |